(12) United States Patent
Edgar et al.

(10) Patent No.: US 9,708,415 B2
(45) Date of Patent: Jul. 18, 2017

(54) ESTERS OF CELLULOSIC MATERIALS AND DIACIDS AND METHOD OF MAKING THEREOF

(75) Inventors: Kevin J. Edgar, Blacksburg, VA (US); Nilanjana Kar, Dossenheim Heidelberg (DE)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 447 days.

(21) Appl. No.: 13/497,171

(22) PCT Filed: Sep. 21, 2010

(86) PCT No.: PCT/US2010/049675
§ 371 (c)(1),
(2), (4) Date: Apr. 16, 2012

(87) PCT Pub. No.: WO2011/035310
PCT Pub. Date: Mar. 24, 2011

(65) Prior Publication Data
US 2012/0197011 A1    Aug. 2, 2012

Related U.S. Application Data

(60) Provisional application No. 61/244,222, filed on Sep. 21, 2009.

(51) Int. Cl.
| | | |
|---|---|---|
| C08B 3/16 | (2006.01) |
| C08B 3/12 | (2006.01) |
| C08B 13/00 | (2006.01) |
| C08B 15/00 | (2006.01) |

(52) U.S. Cl.
CPC .............. *C08B 3/16* (2013.01); *C08B 3/12* (2013.01); *C08B 13/00* (2013.01); *C08B 15/005* (2013.01)

(58) Field of Classification Search
None
See application file for complete search history.

(56) References Cited

U.S. PATENT DOCUMENTS

| | | | |
|---|---|---|---|
| 5,213,794 A * | 5/1993 | Fritsch | A61K 9/2027 424/480 |
| 5,292,783 A | 3/1994 | Buchanan et al. | |
| 6,313,202 B1 | 11/2001 | Buchanan et al. | |
| 6,465,004 B1 * | 10/2002 | Rossi-Montero | A61K 9/7061 424/448 |

OTHER PUBLICATIONS

Edgar, K. J. et al., Progress in Polymer Science, "Advances in cellulose ester performance and application", 2001, vol. 26, pp. 1605-1688.*
Seidel, C. et al., Starch, "Influence of the Cross-linking Agent on the Gel Structure of Starch Derivatives", 2001, vol. 53, pp. 305-310.*
Mukaiyama, T. et al., Chemistry Letters, "Facile Method for the Acylation of Alcohols and Amides by the use of 1,1'-Dimethylstannocene and Acyl Chlorides", 1983, 293-296.*
Liu, Changhui et al., Bioorganic & Medicinal Chemistry, "Syntheses and bioactivities of macrocyclic paclitaxel bis-lactones", 2004, vol. 12, pp. 6147-6161.*
Heinze, et al., "Unconventional Cellulose Esters: Synthesis, Characterization and Structure-Property Relations," Cellulose, 2003, pp. 283-296, vol. 10.
Sroková, et al., Water-Soluble Amphiphilic O-(Carboxymethyl)-Cellulose Derivatives—Synthesis and Properties, Macromolecular Materials and Engineering, 2004, pp. 63-69, vol. 289.
Regiani, et al., "Some Aspects of Acylation of Cellulose Under Homogenous Solution Conditions," Journal of Polymer Science, 1999, pp. 1357-1363, vol. 37.

* cited by examiner

*Primary Examiner* — Eric Olson
(74) *Attorney, Agent, or Firm* — Blank Rome LLP

(57) ABSTRACT

The present invention relates to esters of diacids and cellulosic materials and methods for making thereof. The ester has the chemical composition of Formula (I) Formula I where R1, R2, and R3 can be the same or different, and each of which is selected from —H, —COR', —R''', or —COR'' COOH, with the proviso that at least one of the R1, R2, or R3 is —COR'' COOH; R' is an alkyl, alkenyl, alkynyl, or aromatic group; R'' is an alkyl, alkenyl, or alkynyl group having 4 or more carbon atoms ($\geq C_4$); and R''' is an alkyl, alkenyl, alkynyl, polyol, or aromatic group.

24 Claims, 4 Drawing Sheets

ESTERS OF CELLULOSIC MATERIALS AND DIACIDS AND METHOD OF MAKING THEREOF

This application claims the priority of U.S. Provisional Patent Application No. 61/244,222, filed Sep. 21, 2009, which is incorporated herein by reference.

This invention was made with government support under Grant No. DMR0804501 awarded by the National Science Foundation. The government has certain rights in the invention.

FIELD OF THE INVENTION

The present invention relates to esters of diacids and cellulosic materials and methods for making thereof.

BACKGROUND OF THE INVENTION

The synthesis of water-dispersible derivatives of cellulose has long been a difficult problem, of significant commercial and scientific importance. Practical synthesis of water-soluble cellulose derivatives is possible, for example by acylation followed by extensive back-hydrolysis (Buchanan et al., *Macromolecules* 1991, 24, 3050-3059), or by reaction of cellulose with various alkylating agents under base catalysis, to make derivatives like methylcellulose, carboxymethylcellulose (Heinze and Koschella, *Macromol. Symp.* 2005, 223, 13-39), hydroxyethylcellulose (Arisz et al., *Cellulose* 1996, 3, 45-61), or ethylcellulose (Koschella et al., *Polymer Bulletin* 2006, 57, 33-41). For many applications, water-dispersability is far more desirable than water solubility. For example, in coatings applications, the low viscosity of aqueous dispersions permits the formulation of high-solids coatings, minimizing things like drying time and transportation costs. One of the most straightforward ways to make an aqueous dispersion that can then coalesce into a film is to incorporate carboxyl groups into the molecule; these can be deprotonated by volatile amines, enhancing the dispersability of the polymer. Upon drying, the amine evaporates, promoting the formation of a continuous film. Polymers that are fundamentally hydrophobic, but contain carboxyl groups that enable swelling or dissolution at neutral pH, are also highly useful for drug delivery applications (U.S. Pat. No. 5,994,530). Unfortunately, there are a limited number of methods available to synthesize carboxyl-containing polysaccharides, and particularly carboxyl-containing cellulose derivatives.

The most well known synthesis of carboxyl-containing cellulose derivatives is that of carboxymethylcellulose, noted above. Typically cellulose is reacted with chloroacetic acid in water in the presence of sodium hydroxide as base. Conversion of carboxymethylcellulose into hydrophobic ester derivatives like acetate, propionate and butyrate has been reported (U.S. Pat. Nos. 5,668,273 and 5,792,856). While the resulting carboxymethylcellulose esters are very interesting materials for coatings and drug delivery applications (U.S. Pat. No. 5,994,530), there must be concern with acid-catalyzed esterification of a polymer which contains both carboxyl and hydroxyl groups; cross-linking by esterification is always a possibility. Another method is the reaction of cellulose or a cellulose derivative with a cyclic anhydride, usually with a basic catalyst like pyridine or triethylamine. In that way, syntheses of carboxyl-substituted derivatives of cellulose such as cellulose acetate phthalate (U.S. Pat. No. 5,925,181) and cellulose acetate butyrate succinate (U.S. Pat. No. 5,888,550) have been reported. The known carboxyl-substituted cellulose derivatives prepared by this cyclic anhydride ring-opening chemistry suffer from limited stability in aqueous systems, which is of course a drawback for polymers designed for aqueous dispersions. The stability of cellulose acetate butyrate succinate, for example, is limited (Edgar, *Polymers Paint Colour J.* 1993, 183, 564-571). The author of that study speculated that the particular instability of derivatives like succinate arises from their ability to autocatalyze their hydrolysis (Scheme 1).

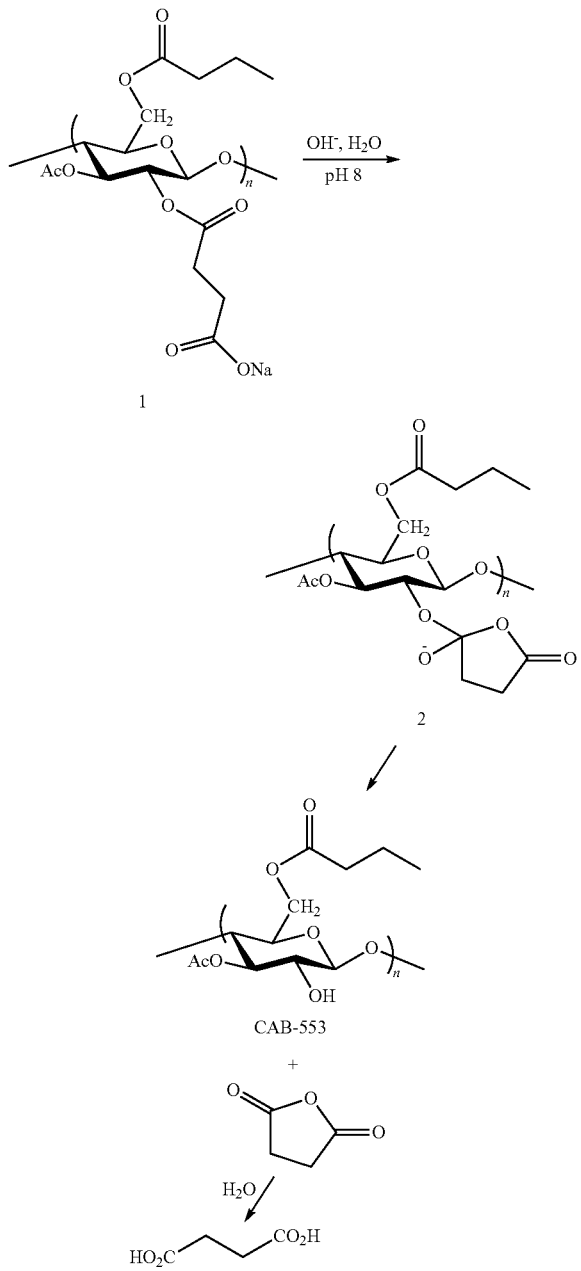

Scheme 1

Cellulose adipate derivatives might be superior to the cellulose phthalates and succinates synthesized in earlier work. They should not be prone to autocatalyzed hydrolysis, since that would require an unfavorable 7-membered ring transition state (Scheme 2). They will be more hydrophobic than the corresponding succinate or phthalate derivatives, and thus would be expected to be more compatible with hydrophobic drugs. Unfortunately, there are no reports of the synthesis of cellulose adipates. Lignocellulosic materials have been subjected to surface treatments with adipic acid in order to crosslink and strengthen those materials (Seidel et al., *Starch* 2001, 53, 305-310; Coma et al., *Carb. Polymers* 2003, 51, 265-271), but the products were poorly characterized and certainly no discrete cellulose derivatives were claimed or described.

Scheme 2.

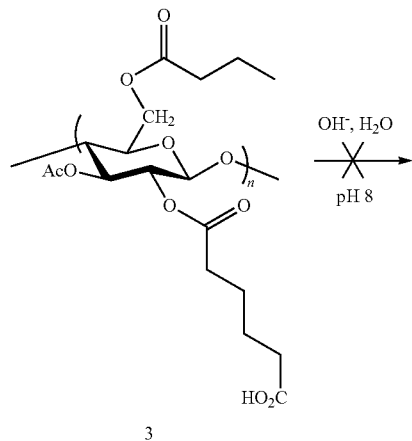

3

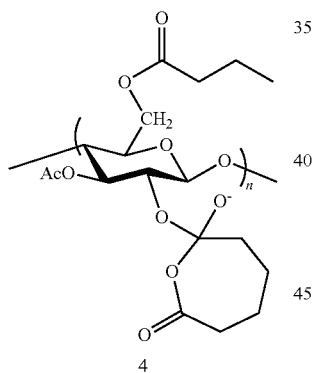

4

Adipic anhydride would be the directly analogous reagent to consider for ring-opening reaction with cellulose to produce cellulose adipates. Adipic anhydride is highly reactive due to its relatively strained 7-membered ring structure. It is prone to homopolymerization, and has most commonly been used to synthesize polyanhydrides (Morello et al., *Microencapsulation* 2007, 24, 40-56) and polyesters (Carnahan et al., *Macromolecules* 2006, 39, 609-616).

Therefore, there remains a need for a method of making esters of diacids and cellulosic materials.

SUMMARY OF THE INVENTION

The present invention is related to esters of cellulosic materials and diacids having the chemical structure of Formula I

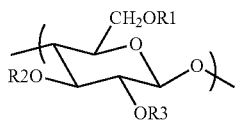

Formula I where R1, R2, and R3 can be the same or different, and each of which is selected from —H, —COR', —R''', or —COR"COOH, with the proviso that at least one of the R1, R2, or R3 is —COR"COOH; R' is an alkyl, alkenyl, alkynyl, or aromatic group; R" is an alkyl, alkenyl, or alkynyl group having 4 or more carbon atoms ($\geq C_4$); and R''' is an alkyl, alkenyl, alkynyl, polyol, or aromatic group. Preferably, the ester contains about 10 to 10,000 monomers and has a degree of substitution (DS) of greater than 0 and less than or equal to 3 ($0<DS\leq3$). The esters of diacids and cellulosic material (Formula I) can be made by reacting a cellulosic material of Formula II with a compound of Formula III to produce an intermediate product:

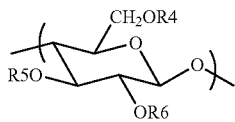

Formula II where R4, R5, and R6 can be the same or different, and each of which is selected from —H, —COR', or —R''', with the proviso that at least one of the R4, R5, and R6 is —H; and R' and R''' are as defined above for Formula I;

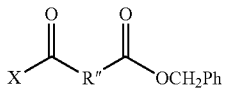

Formula III where X is a halogen; R", as previously defined, is an alkyl, alkenyl, or alkynyl group having 4 or more carbon atoms ($\geq C_4$); and Ph is a phenyl group or substituted phenyl group. The intermediate product is then hydrogenated to form the esters of cellulosic material and diacid of Formula I. The cellulosic material of Formula II contains about 10 to 10,000 monomers and has a DS of greater than or equal to 0 and less than 3 ($0\leq DS<3$). It is important to note that the DS of the cellulosic material (Formula II) is less than that of the final product of Formula I, such that there is some —OH group in the cellulosic material for forming esters with the diacid.

Thus, the overall reaction is as follows:

Formula II+Formula III→intermediate product (Formula IV)→Formula I;

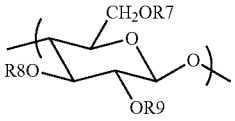

Formula IV where R7, R8, and R9 can be the same or different, and each of which is selected from —H, —COR', —R''', or —COR"COOCH$_2$Ph, with the proviso that at least one of the R7, R8, and R9 is —COR"COOCH$_2$Ph (R', R", and R'" are as previously defined); and Ph is a phenyl or substituted phenyl group. The intermediate product of Formula IV is also contemplated as an embodiment of the present invention.

In the case for Formula I where R" contains four to six carbons (C$_4$ to C$_6$), the esters of diacids and cellulosic materials can also be made by reacting the cellolosic material (Formula II) with acid anhydrides of the diacids. It is important here that the acid anhydride is substantially pure and is free of the poly-acid anhydride. In the presence of the poly-acid anhydride, the reaction produces crosslinked cellulosic materials rather than the esters of Formula I, having free carboxyl or carboxylate groups.

DETAILED DESCRIPTION OF THE PREFERRED EMBODIMENT

Figure 1:
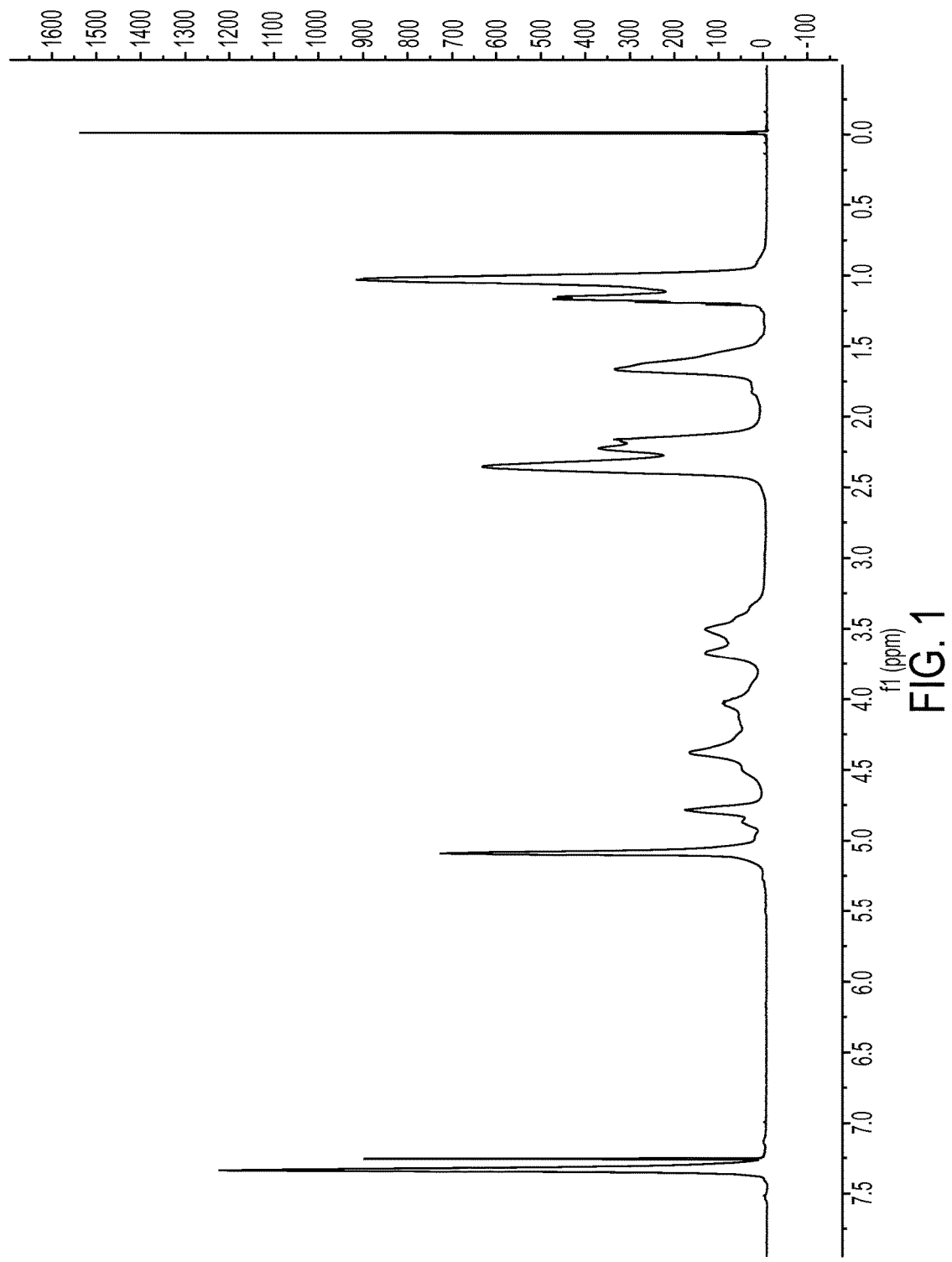
FIG. 1 is a graph showing the $^1$H NMR spectra of benzyl cellulose acetate adipate propionate.
Figure 2:
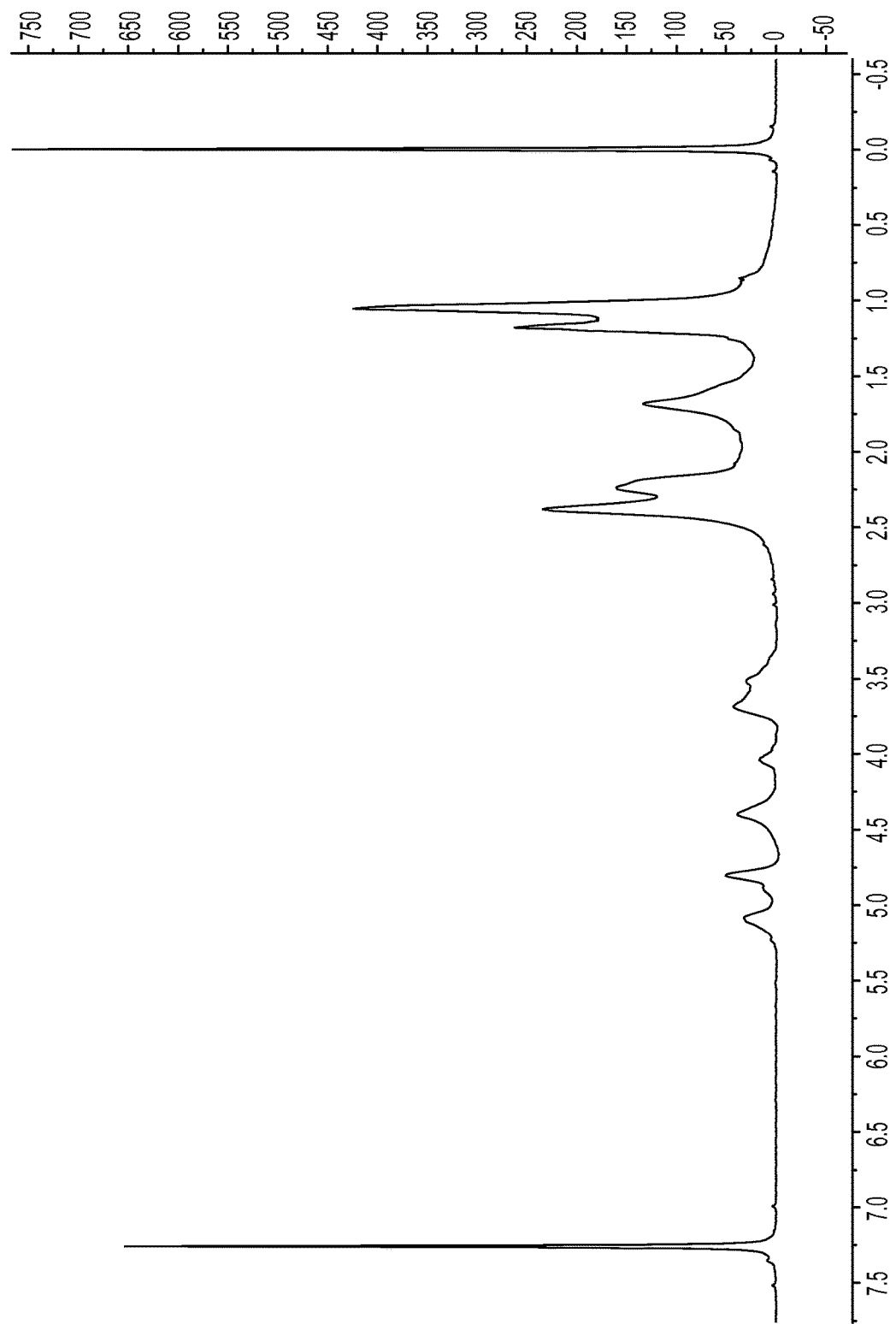
FIG. 2 is a graph showing the $^1$H NMR spectra of cellulose acetate adipate propionate.

In an embodiment, the present invention provides esters of cellulosic materials and diacids. The esters have the chemical composition of Formula I, where R1, R2, and R3 can be the same or different, and each of which is selected from —H, —COR', —R'", or —COR"COOH, with the proviso that at least one of the R1, R2, or R3 is —COR"COOH; R' is an alkyl, alkenyl, alkynyl, or aromatic group; and R" is an alkyl, alkenyl, or alkynyl group having 4 or more carbon atoms (≥C$_4$); and R'" is an alkyl, alkenyl, alkynyl, polyol, or aromatic group. Preferably, the ester contains between 10 and 10,000 monomers. R' preferably contains 1 to 18 carbons (C$_1$-C$_{18}$), more preferably 1 to 6 carbons (C$_1$-C$_6$). R" preferably contains 4 to 6 carbons (C$_4$-C$_6$), most preferably C$_4$. R'" preferably contains 1 to 18 carbons (C$_1$-C$_{18}$), more preferably 1 to 2 carbons, most preferably methyl or ethyl group. The esters of Formula I can have a degree of substitution (DS) of greater than 0 and less than or equal to 3 (0<DS≤3).

The diacid has the general formula HOOC—R"—COOH, where R" is as defined above. The specific diacid can be, but is not limited to, adipic acid, pimelic acid, suberic acid, azelaic acid, sebacic acid, undecanedioic acid, dodecanedioic acid, or combinations thereof.

The cellulosic material has the chemical structure of Formula II, where R4, R5, and R6 can be the same or different, and each of which is selected from —H, —COR', or —R'", with the proviso that at least one of the R4, R5, and R6 is —H; and R', R" and R'" are as defined above for Formula I. The specific cellulosic material can include, but is not limited to, cellulose, cellulose acetate butyrate, cellulose acetate propionate, cellulose acetate, carboxymethylcellulose acetate butyrate, carboxymethylcellulose, cellulose hexanoate, cellulose propionate, cellulose butyrate, cellulose octanoate, cellulose nonanoate, cellulose stearate, cellulose palmitate, cellulose isobutyate, cellulose benzoate, cellulose pivalate, methyl cellulose, ethyl cellulose, or combinations thereof.

In certain preferred embodiments, the esters are cellulose acetate adipate propionate, cellulose acetate adipate butyrate, cellulose acetate adipate, cellulose adipate, cellulose acetate pimelate propionate, cellulose acetate pimelate butyrate, cellulose acetate pimelate, cellulose pimelate, cellulose acetate suberate propionate, cellulose acetate suberate butyrate, cellulose acetate suberate, cellulose suberate, cellulose acetate azelate propionate, cellulose acetate azelate butyrate, cellulose acetate azelate, cellulose azelate, or combinations thereof.

In yet another embodiment, the present invention provides a method for making esters of diacids and cellulosic materials. The esters of the present invention can be made in a two-reaction process. The first reaction involves reacting the cellulosic material of Formula II (where R4, R5, and R6 can be the same or different, and each of which is selected from —H, —COR', or R'", with the proviso that at least one of the R4, R5, and R6 is —H; R' and R'" are as previously defined) with the compound of Formula III (where X is a halogen, preferably chlorine or bromine; R" is as previously defined; and Ph is a phenyl group or substituted phenyl group) to form an intermediate compound of Formula IV (where R7, R8, and R9 can be the same or different, and each of which is selected from —H, —COR', —R'", or —COR"COOCH$_2$Ph, with the proviso that at least one of the R7, R8, and R9 is —COR"COOCH$_2$Ph; and R', R", R'", and Ph are as previously defined). Preferably, the cellulosic material has between 10 and 10,000 monomers and 0≤DS<3. In this reaction, the acid halogenide end of the compound of Formula III reacts with a hydroxyl of the cellulosic material (Formula II) forming a —COR"COOCH$_2$Ph substituent. Thus, it is important that the DS of the cellulosic material contains hydroxyl groups for the reaction to proceed.

The first reaction preferably takes place in a solvent. Any solvent, that can dissolve cellulosic material and that is inert during the reaction, is appropriate for the present invention. Preferred solvents include methyl ethyl ketone (MEK), tetrahydrofuran (THF), dimethyl sulfoxide (DMSO), 1,3 dimethyl-2-imidazolidinone (DMI), dimethylacetamide (DMAC), dioxane, dimethylformamide (DMF), ethyl acetate (EtOAc), butyl acetate (BuOAc), trichloromethane (CHCl$_3$), dichloromethane (CH$_2$Cl$_2$), or combinations thereof.

The first reaction preferably takes at atmospheric pressure and a temperature of about 35° C. to about 100° C., more preferably about 40° C. to about 60° C. It is preferred that the temperature is as low as possible, to minimize side reactions and in consideration of the cost for a large scale process. Preferably, the reaction takes place under nitrogen.

The amount of the compound of Formula III can also be adjusted to meet the desired degree of substitution of the diacid. Preferably, the reaction uses a number of equivalent/anhydroglucose unit (AGU) that is greater than the desired degree of substitution in the final product.

In the second reaction, the intermediate compound (Formula IV) is hydrogenated to form the ester of the present invention (Formula I). Here, the hydrogenation reaction converts the —COR"COOCH$_2$Ph substituent of the intermediate compound to an acidic substituent (—COR"COOH). The hydrogenation reaction preferably takes place by contacting the intermediate compound with hydrogen, preferably hydrogen gas, in the presence of a catalyst. The contact process can take place at atmospheric pressure.

However, greater pressure can be used to accelerate the process. The catalyst used can be, but is not limited to, platinum, palladium, rhodium, or ruthenium. The preferred catalysts are Pd/C, Pd(OH)$_2$ or any other commonly known hydrogenation catalyst. The preferred solvents include THF, dioxane, DMI, DMAc, DMF, acetic acid (which can also act as a promoter), or combinations thereof. The preferred catalyst/solvent combination is Pd(OH)$_2$ and acetic acid (preferably 50% acetic acid in THF).

The intermediate compound (Formula IV) can be purified prior to the hydrogenation reaction. The purification process generally involves precipitation of the intermediate compound with an antisolvent, such as isopropanol or hexane. Several precipitations may be necessary to purify the intermediate compound prior to the hydrogenation reaction. Alternatively, other purification methods known in the prior art can be used to purify the intermediate compound.

The compound of Formula III can be made by converting one end of the diacid to a benzyl ester or substituted benzyl ester, and the other end to an acid halogenide. Preferably, the first step involves esterification of one end of the diacid to form a benzyl or substituted benzyl ester. The reaction is as depicted in Scheme 3:

Scheme 3

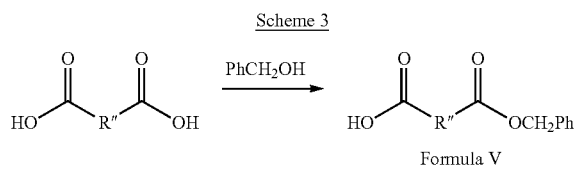

Formula V

Here, the diacid reacts with benzyl alcohol or a substituted benzyl alcohol (PhCH$_2$OH) to form the compound of Formula V (where R" and Ph are as previously defined). The reaction preferably takes place in a solvent, such as toluene, at reflux temperature, in a Dean-Stark apparatus, until the amount of water collected equals the theoretical amount of water produced when all of the diacids are esterified to form the compound of Formula V. The method similar to or as described by English et al. (J. Med. Chem. 1990, 33:344-347), which is incorporated herein by reference, is the preferred method for this reaction.

The compound of Formula V is then converted to an acid halogenide by the reaction in scheme 4, where X is a halogen:

Scheme 4

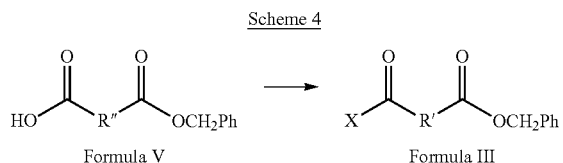

Formula V          Formula III

Methods known in the prior art for forming acid halogenides from carboxylic acids are appropriate for the present invention. The compound of Formula V can be reacted with SOCl$_2$, PX$_3$ (such as PCl$_3$ or PBr$_3$) or PX$_5$ (such as PCl$_5$ or PBr$_5$) to form the compound of Formula III. Alternatively, the reaction of the compound of Formula V with oxalyl halogenide (such as oxalyl chloride or oxalyl bromide) is also appropriate for the present invention. The method similar to or as described by Abell et al. (J. Org. Chem. 1990, 55:5217-5221), which is incorporated herein by reference, is preferred for the present invention.

In a further embodiment, the present invention provides a second method for making esters of diacids and cellulosic material. This method is most appropriate where the R" of the diacid contains 4 to 6 carbons (C$_4$-C$_6$). This method comprises reacting the cellulosic material (Formula II) with the acid anhydride of the diacid. Thus, for R" of —CH$_2$CH$_2$CH$_2$CH$_2$—, the adipic anhydride is used; for R" of —CH$_2$CH$_2$CH$_2$CH$_2$CH$_2$—, the pimelic anhydride is used; and for R" of —CH$_2$CH$_2$CH$_2$CH$_2$CH$_2$CH$_2$—, the suberic anhydride is used. To avoid crosslinking of the product, however, the acid anhydride used should be pure and substantially free of poly-acid anhydrides. "Pure," as used herein, means that the acid anhydride is at least 95% pure by proton NMR, preferably at least 98% pure. "Substantially free of poly-acid anhydrides," as used herein, means that the poly-acid anhydrides should be present at no more than 5% as determined by proton NMR, preferably no more than 2%.

The reaction with the acid anhydride preferably takes place in a solvent. Appropriate solvents for the present invention include those which can dissolve the cellulosic material and are inert during the reaction. Preferred solvents should be relatively neutral (neither acidic nor basic), such as MEK or DMI.

The reaction also preferably takes place at atmospheric pressure and a temperature of about 50° C. to about 80° C., more preferably about 50° C. to about 70° C. It is preferred that the temperature is as low as possible, to minimize side products and in consideration of the cost of a scaled-up process. Overall, the goal of the reaction is to minimize the formation or presence of the poly-acid anhydride, which promotes crosslinking in the final product (ester of the diacid and the cellulosic material).

The preferred cellulosic material for reacting with the acid anhydride has the chemical composition of Formula II. More preferably, the cellulosic material is a cellulose ester (i.e. at least one of the R4, R5, and R6 is —COR').

Without further description, it is believed that one of ordinary skill in the art can, using the preceding description and the following illustrative examples, make and utilize the compounds of the present invention and practice the claimed methods. The following examples are given to illustrate the present invention. It should be understood that the invention is not to be limited to the specific conditions or details described in those examples.

Example 1—Synthesis of Monobenzyl Adipate

Adipic acid (73 g, 0.5 mol), benzyl alcohol (81 g, 0.75 mol), p-toluenesulfonic acid (0.95 g, 5 mmol), and toluene (400 mL) were combined in a flask equipped with a Dean-Stark trap and heated at reflux until the theoretical amount of H$_2$O (13.5 mL, 0.75 mol) was obtained. The solution was then cooled, 300 mL of H$_2$O added, and the pH adjusted to 8 with 6 N NaOH. The aqueous layer was separated and washed with ether (2×100 mL), 200 mL of fresh ether was added, and the pH was adjusted to 2.0 with 6 N HCl. The ether layer was separated, dried (Na$_2$SO$_4$), and concentrated to yield 47 g of monobenzyl adipate (40%) as a colorless oil.

$^1$H NMR (CDCl$_3$) 1.68 (m, 4H), 2.36 (m, 4H), 5.09 (s, 2H), 7.32 (m, 5H).

The process is depicted in Scheme 5.

Scheme 5

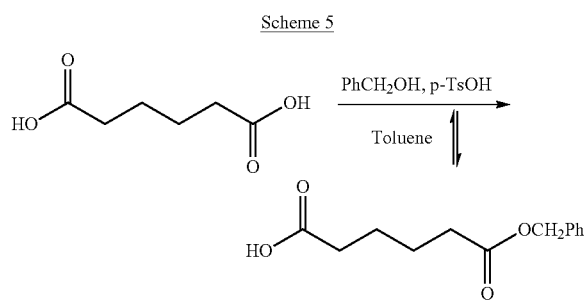

Example 2—Synthesis of Monobenzyl Adipoyl Chloride

The overall process is depicted in Scheme 6.

Scheme 6

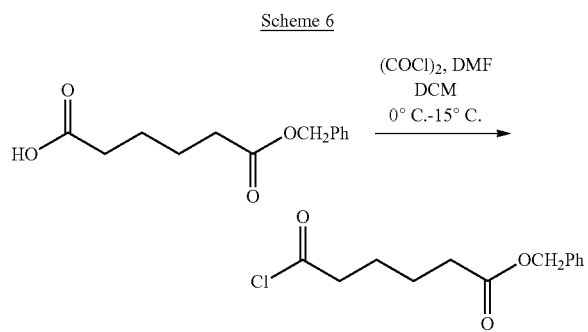

A solution of monobenzyl adipate (20 g, 0.08 mol) and DMF (1 drop) in dichloromethane was cooled to 0° C. and oxalyl chloride (57.15 g, 0.45 moles) was slowly added. After 30 min at 15° C., the solvent was removed under reduced pressure. Toluene (200 mL) was added to the resultant oil and again the solvent was removed to yield the monobenzyl adipoyl chloride as an oil that was not purified further.

$^1$H NMR (CDCl$_3$) 1.73 (m, 4H), 2.39 (t, 2H), 2.90 (t, 2H), 5.12 (s, 2H), 7.32 (m, 5H).

Example 3—Reaction of Cellulose Acetate Propionate with Monobenzyl Adipoyl Chloride Cellulose acetate propionate (CAP) (1 g, 3.52 mmol) was dissolved in methyl ethyl ketone (MEK, 10 mL) and the solution was heated to 60° C. with stirring under nitrogen. Triethylamine (0.53 mL, 3.87 mmol, 1.1 equiv) was added all at once, then monobenzyl adipoyl chloride (0.89 g, 3.52 mmol, 1 equiv) was added. An immediate precipitate (presumed to be triethylammonium chloride) was observed. The solution was stirred at 60° C. for 20 h. The reaction mixture was filtered, then added dropwise to isopropyl alcohol at room temperature with stirring. The precipitate was collected by filtration and washed with water. It was redissolved in chloroform and precipitated with hexane. The product was washed with hexane and vacuum-dried at 50° C.

$^1$H NMR (CDCl$_3$): 1.02-1.20 (m, COCH$_2$CH$_3$ of propionate), 1.66 (broad s, COCH$_2$CH$_2$CH$_2$CH$_2$CO of adipate), 2.16-2.35 (m, COCH$_2$CH$_3$ of propionate, COCH$_3$ of acetate and COCH$_2$CH$_2$CH$_2$CH$_2$CO of adipate), 3.25-5.24 (cellulose backbone), 5.10 (CH$_2$C$_6$H$_5$), 7.33 (CH$_2$C$_6$H$_5$). Degree of substitution (DS) by $^1$H NMR: adipate 0.33, propionate 2.09, acetate 0.04. Yield: 58%.

Example 4—Reaction of Cellulose Acetate Butyrate with Monobenzyl Adipoyl Chloride A similar procedure as in Example 3 was followed for the reactions of cellulose acetate butyrate (CAB) with monobenzyl adipoyl chloride. $^1$H NMR (CDCl$_3$): 0.89-0.98 (m, COCH$_2$CH$_2$CH$_3$ of butyrate), 1.54-1.64 (m, COCH$_2$CH$_2$CH$_3$ of butyrate, COCH$_2$CH$_2$CH$_2$CH$_2$CO of adipate), 2.14-2.31 (m, COCH$_2$CH$_2$CH$_3$ of butyrate, COCH$_3$ of acetate and COCH$_2$CH$_2$CH$_2$CH$_2$CO of adipate), 3.25-5.31 (cellulose backbone), 5.10 (CH$_2$C$_6$H$_5$), 7.33 (CH$_2$C$_6$H$_5$). DS by $^1$H NMR: adipate 0.5, butyrate 1.99, acetate 0.14. Yield: 60%.

Example 5—Reaction of Cellulose Acetate with Monobenzyl Adipoyl Chloride

Cellulose acetate (CA) (1 g, 4.18 mmol) was dissolved in N,N-dimethylimidazolidinone (DMI, 10 mL) and the solution was heated to 100° C. with stirring under nitrogen. Triethylamine (0.63 mL, 4.59 mmol, 1.1 equiv) was added all at once, then monobenzyl adipoyl chloride (2.12 g, 8.36 mmol, 2 equiv) was added. The solution was stirred at 100° C. for 20 h. The reaction mixture was filtered to remove the needle shaped crystals of triethylammonium chloride. The filtrate was added dropwise to water at room temperature in a high shear mixer. The precipitate was redissolved in isopropanol and precipitated with water. The product, benzyl cellulose acetate adipate, was washed with water and vacuum-dried.

$^1$H NMR (CDCl$_3$): 1.66 (br s, COCH$_2$CH$_2$CH$_2$CH$_2$CO of adipate), 1.94-2.09 (m, COCH$_3$ of acetate), 2.37 (br s, COCH$_2$CH$_2$CH$_2$CH$_2$CO of adipate), 3.25-5.31 (cellulose backbone), 5.10 (CH$_2$C$_6$H$_5$), 7.33 (CH$_2$C$_6$H$_5$). DS by $^1$H NMR: adipate 0.7, acetate 1.8. Yield: 82%.

Example 6—Reaction of Cellulose with Monobenzyl Adipoyl Chloride

Cellulose (0.63 g, 3.88 mmol) was dissolved in DMAC/LiCl by an earlier reported procedure[32]. To this solution at 60° C. was added triethylamine (0.59 ml, 1.1 equiv). Then the monobenzyl adipoyl chloride (3 g, 11.64 mmol, 3 equiv) was added dropwise at 60° C. The reaction mixture was stirred for 20 h at that temperature, and then cooled to room temperature and added to isopropyl alcohol to precipitate the product. The product benzyl cellulose adipate was filtered off, washed with isopropanol, water, and then was vacuum-dried at 40° C. to afford 1.83 g (78% yield) of white powder.

$^1$H NMR (DMSO-d$_6$): 1.47 (br s, COCH$_2$CH$_2$CH$_2$CH$_2$CO of adipate), 2.37 (br s, COCH$_2$CH$_2$CH$_2$CH$_2$CO of adipate), 3.25-5.31 (cellulose backbone), 5.10 (CH$_2$C$_6$H$_5$), 7.33 (CH$_2$C$_6$H$_5$). DS by $^1$H NMR: adipate 2.0. Yield: 78%.

Example 7—Hydrogenation of the Benzyl Cellulose Ester

The products of Examples 3-6 (200 mg) were dissolved in THF and to that solution was added 10% palladium on carbon (100 mg). A hydrogen balloon was attached to the flask and the solution was stirred overnight under a hydrogen atmosphere. The mixture was filtered through Celite and evaporated to afford the product. The product was dissolved in chloroform and reprecipitated in hexane.

$^1$H NMR (CDCl$_3$) for cellulose acetate adipate propionate: 1.02-1.20 (m, COCH$_2$CH$_3$ of propionate), 1.66 (broad s, COCH$_2$CH$_2$CH2CH$_2$CO of adipate), 2.16-2.35 (m, COCH$_2$CH$_3$ of propionate, COCH$_3$ of acetate and COCH$_2$CH$_2$CH$_2$CH$_2$CO of adipate), 3.25-5.24 (cellulose backbone). DS by $^1$H NMR: adipate 0.33, propionate 2.09, acetate 0.04. Yield: 82%.

$^1$H NMR (CDCl$_3$) for cellulose acetate adipate butyrate: 0.89-0.98 (m, COCH$_2$CH$_2$CH$_3$ of butyrate), 1.54-1.64 (m, COCH$_2$CH$_2$CH$_3$ of butyrate, COCH$_2$CH$_2$CH$_2$CH$_2$CO of adipate), 2.14-2.31 (m, COCH$_2$CH$_2$CH$_3$ of butyrate, COCH$_3$ of acetate and COCH$_2$CH$_2$CH$_2$CH$_2$CO of adipate), 3.25-5.31 (cellulose backbone). DS by $^1$H NMR: adipate 0.5, butyrate 1.99, acetate 0.14. Yield: 85%.

$^1$H NMR (CDCl$_3$) for cellulose acetate adipate: 1.66 (br s, COCH$_2$CH$_2$CH$_2$CO of adipate), 1.94-2.09 (m, COCH$_3$ of acetate), 2.37 (br s, COCH$_2$CH$_2$CH$_2$CH$_2$CO of adipate), 3.25-5.31 (cellulose backbone), DS by $^1$H NMR: adipate 0.7, acetate 1.8. Yield: 88%.

Table 1 summarizes the result of the synthesis of cellulosic adipate:

Example 8—Reaction of Cellulose with Adipic Anhydride

Figure 3:
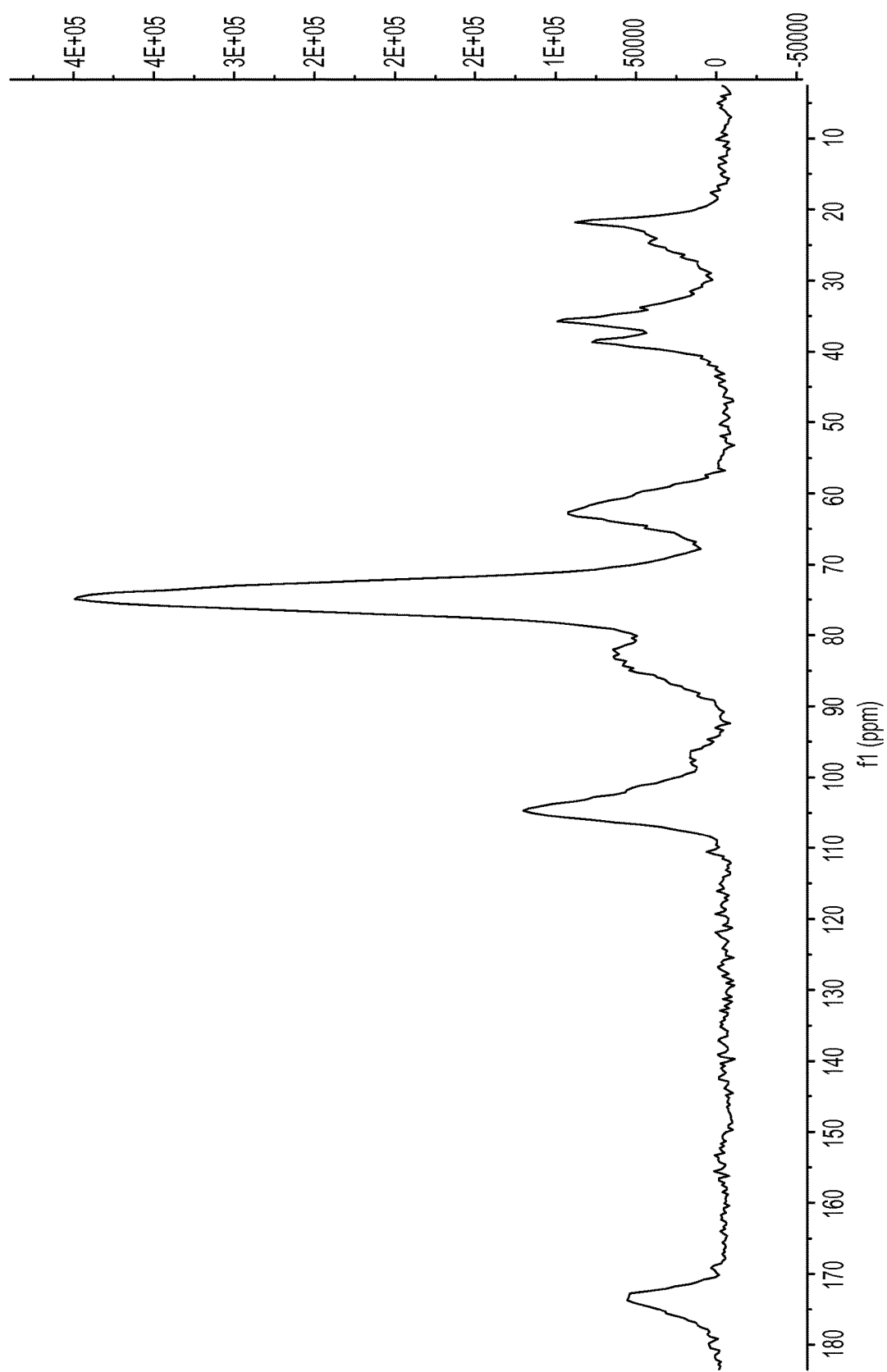
FIG. 3 is a graph showing the $^{13}$C NMR spectra of the of the dried, gel-like product of the reaction between cellulose and adipic anhydride.
Figure 4:
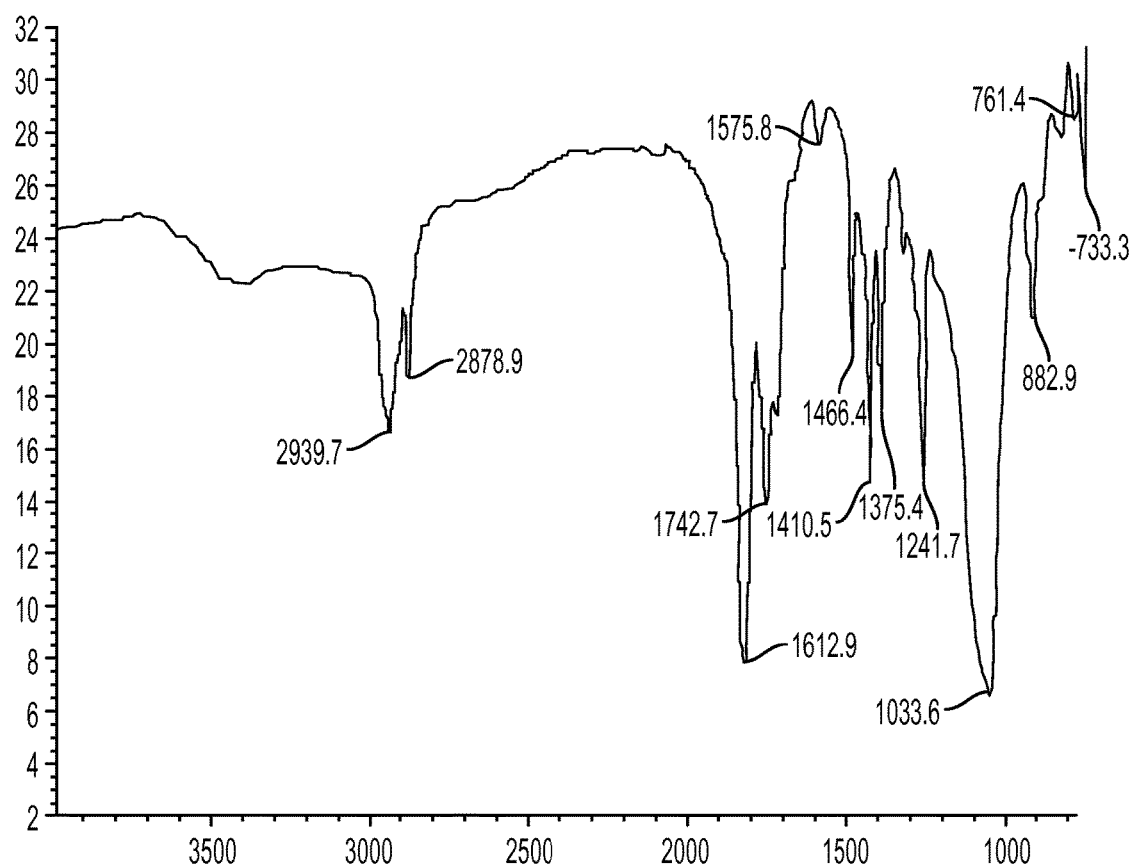
FIG. 4 is a graph showing the IR spectrum of the of the dried, gel-like product of the reaction between cellulose and adipic anhydride.

Cellulose (8.00 g, 49.3 mmol) was dissolved in N,N-dimethylacetamide (DMAC, 300 mL) and lithium chloride (15 g) by the procedure reported by U.S. Pat. No. 5,888,550, which is incorporated herein by reference. To this solution, at 80° C. under nitrogen, adipic anhydride (6.31 g, 49.3 mmol), in DMAC (20 mL), was added dropwise. After 45 min it was observed that the solution gelled, and the gel broke up into small, translucent balls (ca. 1-2 cm in diameter) with mechanical stirring. The product was isolated by adding the reaction mixture to methanol, filtration of the gel-like product, and then extensive washing of the product with methanol, then with water. The product was insoluble in all solvents tried, including DMSO and chloroform. Analysis of the dried product by infrared spectroscopy, and by solid-phase $^{13}$C spectroscopy, revealed that it was a cellulose adipate, which was cross-linked. Solid state $^{13}$C NMR (FIG. 3) showed adipate peaks but the IR spectrum (FIG. 4) showed no prominent COOH absorption, indicating the lack of pendent carboxylic acid groups and affirming the presence of ester cross-links.

Solid-state CP/MAS $^{13}$C (ppm): 173.5 (C=O), 104.6 (C-1), 83.1 (C-4), 74.8 (C-5, C-2, C-3), 62.7 (C-6), 33.8-38.5 (COCH$_2$CH$_2$CH$_2$CH$_2$CO of adipate), 21.7-24.6 (COCH$_2$CH$_2$CH$_2$CH$_2$CO of adipate). IR (cm$^{-1}$): 1812, 1742 (anhydride doublet).

It is likely that the cross-linking is being caused by reaction between cellulose and poly(adipic anhydride) (Scheme 7), in which each poly(adipic anhydride) chain reacts on average with more than one cellulose molecule.

TABLE 1

Synthesis of Cellulosic Adipate Derivatives

| Entry | Cellulose | Acid Chloride (equiv) | Solvent | Temperature | Pr | Bu | Ac | Ad | Total | Solubility |
|---|---|---|---|---|---|---|---|---|---|---|
| 1 | CAP | 1 | MEK | 60° C. | 2.09 | — | 0.04 | 0.33 | 2.46 | THF, CHCl$_3$, DMSO |
| 2 | CAP | 3 | MEK | 60° C. | 2.09 | — | 0.04 | 0.50 | 2.63 | THF, CHCl$_3$, DMSO |
| 3 | CAB | 1 | MEK | 60° C. | — | 1.99 | 0.14 | 0.50 | 2.63 | THF, CHCl$_3$, DMSO |
| 4 | CA | 2 | DMI | 100° C. | — | — | 1.8 | 0.7 | 2.5 | THF, CHCl$_3$, DMSO |
| 5 | HWP | 3 | DMSO/LiCl | 60° C. | — | — | — | 2 | 2 | Sparingly soluble in DMSO |

Pr = Propionate,
Bu = Butyrate,
Ac = Acetate,
Ad = Adipate,
CAP = Cellulose Acetate Propionate,
CAB = Cellulose Acetate Butyrate,
CA = Cellulose Acetate,
HWP = Hardwood Pulp Scheme 7

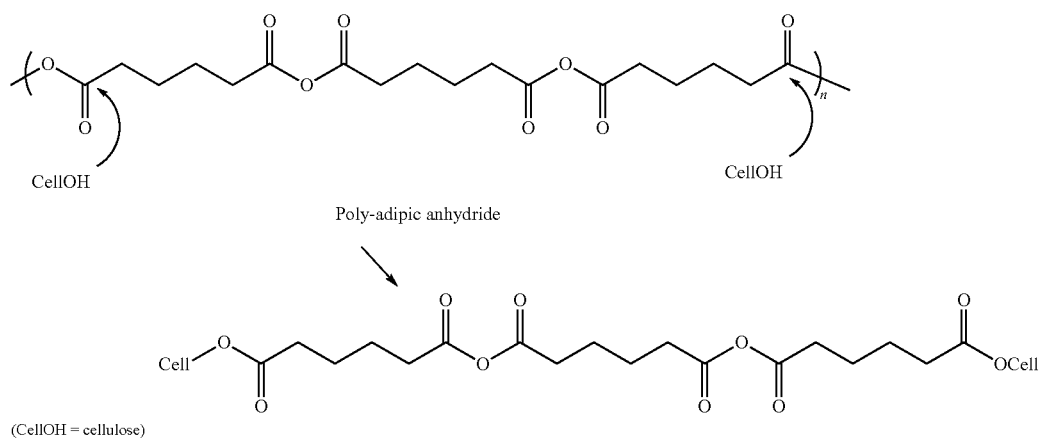

(CellOH = cellulose)

We have observed that even freshly prepared adipic anhydride contains a measurable amount of poly(adipic anhydride) by $^1$H NMR spectroscopy (poly(adipic anhydride) gave signals at 1.75 and 2.5 ppm due to —$CH_2CH_2$— and CH2-CO—O—CO—CH2 protons, respectively, and adipic anhydride signals appeared at 2.8 and 2.0 ppm), and that this amount grows over the course of days as the adipic anhydride is stored, even if refrigerated. That is consistent with the observed anhydride carbonyl absorbances in the IR spectrum (1812, 1742 $cm^{-1}$).

The problem of the cross-linked product was resolved by using purified adipic anhydride (~98%). Even small amounts of polyadipic anhydride (>5%) resulted in a cross-linked product. The following Table 2 shows various soluble esters made from adipic anhydride (~98% pure and <5% polyadipic anhydride) and various cellulosic materials:

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A compound comprising units of an ester of a cellulosic material and a diacid, each unit represented by Formula I

TABLE 2

Synthesis of Cellulose Adipate Derivatives using Adipic Anhydride

| Entry | Cellulose | Adipic anhyd. (equiv) | Solvent | Temperature | Degree of Substitution (DS) | | | | Total | Solubility |
| | | | | | Pr | Bu | Ac | Ad | | |
|---|---|---|---|---|---|---|---|---|---|---|
| 1 | CAP | 1 | MEK | 60° C. | 2.09 | — | 0.04 | 0.20 | 2.33 | CHCl$_3$ (partly), DMSO |
| 2 | CAB | 1 | MEK | 60° C. | — | 1.99 | 0.14 | 0.20 | 2.33 | CHCl$_3$ (partly), DMSO |
| 3 | CA (DS Ac 2.45) | 3 | MEK | 60° C. | — | — | 2.45 | 0.55 | 3.00 | DMSO |
| 4 | CA (DS Ac 1.8) | 3 | DMI | 60° C. | — | — | 1.80 | 0.70 | 2.50 | DMSO |

Pr = Propionate,
Bu = Butyrate,
Ac = Acetate,
Ad = Adipate,
CAP = Cellulose Acetate Propionate,
CAB = Cellulose Acetate Butyrate,
CA = Cellulose Acetate.

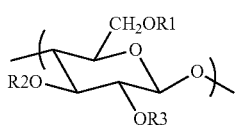

Formula I wherein for each unit represented by Formula I, R1, R2, and R3 are the same or different, and each of which is selected from —H, —COR', —R''', or —COR"COOH, with the proviso that the compound contains at least one type of —COR"COOH, and at least one type of —COR'; further wherein R' is an alkyl, alkenyl, alkynyl, or aromatic group;

R" is an alkyl, alkenyl, or alkynyl group having 4 or more carbon atoms;

R''' is an alkyl, alkenyl, alkynyl, polyol, or aromatic group, and wherein a degree of substitution is not less than 0.33 for —COR"COOH.

2. The compound of claim 1, wherein R' contains 1 to 18 carbons.

3. The compound of claim 1, wherein R" contains four to six carbons.

4. The compound of claim 1, wherein R" is —CH$_2$CH$_2$CH$_2$CH$_2$—.

5. The compound of claim 1, wherein R''' contains 1 to 18 carbons.

6. The compound of claim 1, wherein R''' is methyl or ethyl.

7. The compound of claim 1, wherein the compound contains between 10 and 10,000 units each represented by Formula I.

8. A method for making a compound comprising units of an ester of a cellulosic material and a diacid, each unit represented by Formula I

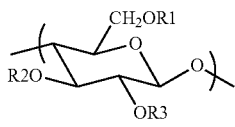

Formula I wherein for each unit represented by Formula I, $R_1$, $R_2$, and $R_3$ are the same or different, and each of which is selected from —H, —COR', —R''', or —COR"COOH, with the proviso that the compound contains at least one type of —COR"COOH, and at least one type of —COR'; further wherein R' is an alkyl, alkenyl, alkynyl, or aromatic group;

R" is an alkyl, alkenyl, or alkynyl group having 4 or more carbon atoms;

R''' is an alkyl, alkenyl, alkynyl, polyol, or aromatic group, and wherein a degree of substitution is not less than 0.33 for —COR"COOH, the method comprising the steps of i) reacting a compound of formula II

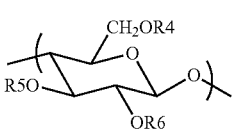

Formula II wherein $R_4$, $R_5$, and $R_6$ can be the same or different, and each of which is selected from —H, —COR', or —R''', with the proviso that at least one of the $R_4$, $R_5$, and $R_6$ is —H, wherein R' can be an alkyl, alkenyl, alkynyl, or aromatic group, and wherein R''' is an alkyl, alkenyl, alkynyl, polyol, or aromatic group, with a compound of Formula III

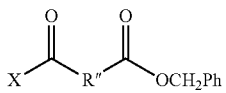

Formula III wherein X is a halogen, wherein R" is an alkyl, alkenyl, or alkynyl group having 4 or more carbon atoms, and wherein Ph is a phenyl group or substituted phenyl group, to produce an intermediate compound; and ii) hydrogenating the intermediate compound to produce the compound comprising units of an ester of a cellulosic material and a diacid, each unit represented by Formula I.

9. The method of claim 8, wherein R' contains 1 to 18 carbons.

10. The method of claim 8, wherein R' contains four or more carbons.

11. The method of claim 8, wherein R''' contains 1 to 18 carbons.

12. The method of claim 8, wherein the compound contains between 10 and 10,000 units, each represented by Formula I.

13. The method of claim 8, wherein step i) takes place in a solvent selected from the group consisting of methyl ethyl ketone, tetrahydrofuran dimethyl sulfoxide, 1,3 dimethyl-2-imidazolidinone, dimethylacetamide, dioxane, dimethylformamide, ethyl acetate, butyl acetate, trichloromethane, dichloromethane, and combinations thereof.

14. The method of claim 8, wherein step i) takes place at atmospheric pressure and a temperature of about 35° C. to about 100° C.

15. The method of claim 8, wherein step ii) comprises contacting hydrogen gas with the intermediate compound in the presence of a catalyst.

16. A compound having a chemical composition of Formula IV

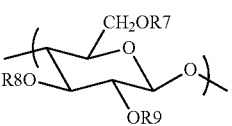

Formula IV wherein $R_7$, $R_8$, and $R_9$ can be the same or different, and each of which is selected from —H, —COR', —R''', or —COR"COOCH$_2$Ph, with the proviso that at least one of the $R_7$, $R_8$, and $R_9$ is —COR"COOCH$_2$Ph, wherein R' is an alkyl, alkenyl, alkynyl, or aromatic group, wherein R" is an alkyl, alkenyl, or alkynyl group having 4 or more carbon atoms wherein R''' is an alkyl, alkenyl, alkynyl, polyol, or aromatic group, wherein Ph is a phenyl or substituted phenyl group, and wherein a degree of substitution is not less than 0.33 for —COR"COOCH$_2$Ph.

17. The compound of claim 1, wherein the compound contains one type of —COR"COOH, and R" is a $C_4$-$C_{10}$ alkylene group.

18. The compound of claim 1, wherein the —COR"COOH is —CO(CH$_2$)$_4$COOH, —CO(CH$_2$)$_6$COOH, or —CO(CH$_2$)$_8$COOH.

19. The compound of claim 1, wherein the —COR' is —COCH$_3$, —COCH$_2$CH$_3$, or —CO(CH$_2$)$_2$CH$_3$.

20. The compound of claim 1, wherein the compound contains two types of —COR', and further wherein the two types of —COR' are —COCH$_3$ and —COCH$_2$CH$_3$, or —COCH$_3$ and —CO(CH$_2$)$_2$CH$_3$.

21. The compound of claim 1, wherein the —COR"COOH is —CO(CH$_2$)$_4$COOH, and the —COR' is —COCH$_3$, —COCH$_2$CH$_3$, or —CO(CH$_2$)$_2$CH$_3$.

22. The compound of claim 1, wherein the —COR"COOH is —CO(CH$_2$)$_4$COOH, and the compound contains two types of —COR', and further wherein the two types of —COR' are —COCH$_3$ and —COCH$_2$CH$_3$, or —COCH$_3$ and —CO(CH$_2$)$_2$CH$_3$.

23. The compound of claim 1, wherein the —COR"COOH is —CO(CH$_2$)$_6$COOH, and the compound contains two types of —COR', and further wherein the two types of —COR' are —COCH$_3$ and —COCH$_2$CH$_3$, or —COCH$_3$ and —CO(CH$_2$)$_2$CH$_3$.

24. The compound of claim 1, wherein the —COR"COOH is —CO(CH$_2$)$_8$COOH, and the compound contains two types of —COR', and further wherein the two types of —COR' are —COCH$_3$ and —COCH$_2$CH$_3$, or —COCH$_3$ and —CO(CH$_2$)$_2$CH$_3$.

\* \* \* \* \*